(12) United States Patent
Lai

(10) Patent No.: US 12,086,604 B2
(45) Date of Patent: Sep. 10, 2024

(54) BOOT CIRCUIT, BOOT METHOD, AND BOOT SYSTEM

(71) Applicant: Realtek Semiconductor Corporation, Hsinchu (TW)

(72) Inventor: Yen-Hsin Lai, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 861 days.

(21) Appl. No.: 17/159,536

(22) Filed: Jan. 27, 2021

(65) Prior Publication Data
US 2021/0247986 A1 Aug. 12, 2021

(30) Foreign Application Priority Data
Feb. 6, 2020 (TW) .................................. 109103755

(51) Int. Cl.
*G06F 9/4401* (2018.01)
*G06F 1/08* (2006.01)

(52) U.S. Cl.
CPC .............. *G06F 9/4401* (2013.01); *G06F 1/08* (2013.01)

(58) Field of Classification Search
CPC ................................. G06F 9/4401; G06F 1/08
USPC ............................................................. 713/2
See application file for complete search history.

(56) References Cited

U.S. PATENT DOCUMENTS

| | | | | |
|---|---|---|---|---|
| 5,901,291 A * | 5/1999 | Feeney | ............... | H04L 49/9031 370/465 |
| 6,763,457 B1 * | 7/2004 | Aguilar | ................. | G06F 9/4416 709/222 |
| 7,478,147 B2 * | 1/2009 | Sharma | ............... | H04L 63/0428 717/176 |
| 8,122,234 B1 * | 2/2012 | Orr | ..................... | G06F 11/1417 713/1 |

(Continued)

FOREIGN PATENT DOCUMENTS

CN 2932310 Y 8/2007
CN 104967160 A 10/2015
(Continued)

OTHER PUBLICATIONS

Structured Computer Organization Third Edition by Andrew S. Tanenbaum (Year: 1990).*

*Primary Examiner* — Paul R. Myers
(74) *Attorney, Agent, or Firm* — Locke Lord LLP; Tim Tingkang Xia, Esq.

(57) ABSTRACT

A boot circuit is configured to be coupled to a first memory. Boot information is stored in the first memory. The boot circuit is configured to receive the boot information. The boot circuit includes a first control circuit, a digital signal processing circuit, a detector circuit, a second control circuit, and a memory access circuit. The detector circuit is configured to generate a detection result according to the received boot information. The second control circuit is configured to control the first control circuit according to the detection result, to adjust a transmission parameter for transmitting the (Continued)

boot information. Based on the adjusted transmission parameter, the boot information is retransmitted from the first memory, via the memory access circuit, to the digital signal processing circuit. The digital signal processing circuit performs a boot process according to the retransmitted boot information.

18 Claims, 4 Drawing Sheets

(56) References Cited

U.S. PATENT DOCUMENTS

| | | | | |
|---|---|---|---|---|
| 8,443,183 | B2* | 5/2013 | Lin | G06F 9/4406 713/1 |
| 8,613,074 | B2 | 12/2013 | Rudelic et al. | |
| 9,239,724 | B2 | 1/2016 | Chao | |
| 9,411,688 | B1* | 8/2016 | Poolla | H03K 19/17764 |
| 9,652,252 | B1* | 5/2017 | Kochar | G06F 1/3234 |
| 9,983,889 | B1* | 5/2018 | Sarmah | G06F 9/445 |
| 2002/0083316 | A1* | 6/2002 | Platenberg | G06F 9/4416 713/2 |
| 2003/0187997 | A1* | 10/2003 | Alexis | H04L 61/5014 709/229 |
| 2005/0060443 | A1* | 3/2005 | Rosner | G06F 13/128 710/33 |
| 2006/0015618 | A1* | 1/2006 | Freimuth | H04L 49/90 711/E12.057 |
| 2006/0245366 | A1* | 11/2006 | Binde | H04L 5/1446 370/246 |
| 2008/0126509 | A1* | 5/2008 | Subramanian | H04L 47/10 709/214 |
| 2009/0024714 | A1* | 1/2009 | Raisch | H04L 69/161 709/212 |
| 2009/0254641 | A1* | 10/2009 | Liu | G06F 9/4416 709/222 |
| 2009/0327683 | A1* | 12/2009 | Cabot | G06F 9/4416 713/2 |
| 2010/0017659 | A1* | 1/2010 | Dos Remedios | G06F 21/575 714/36 |
| 2010/0235618 | A1* | 9/2010 | Erforth | G06F 9/4403 713/500 |
| 2012/0084547 | A1* | 4/2012 | Jung | G06F 15/177 713/2 |
| 2013/0033953 | A1* | 2/2013 | Ge | G06F 1/26 365/226 |
| 2013/0124844 | A1* | 5/2013 | Baratam | G06F 13/1694 713/2 |
| 2014/0173265 | A1* | 6/2014 | Kegel | G06F 21/575 713/2 |
| 2014/0380034 | A1* | 12/2014 | Rothman | G06F 21/572 710/313 |
| 2015/0039876 | A1* | 2/2015 | Baratam | G06F 9/4401 713/2 |
| 2017/0123814 | A1* | 5/2017 | Seo | G06F 3/0611 |
| 2017/0308705 | A1* | 10/2017 | Karaginides | G06F 8/654 |
| 2018/0206925 | A1* | 7/2018 | Radel | G16H 40/40 |
| 2020/0019708 | A1* | 1/2020 | Puthillathe | H04L 63/10 |
| 2021/0016728 | A1* | 1/2021 | Mukherjee | B60R 16/03 |

FOREIGN PATENT DOCUMENTS

| | | |
|---|---|---|
| TW | 201229761 A | 7/2012 |
| TW | 201430701 A | 8/2014 |

* cited by examiner

BOOT CIRCUIT, BOOT METHOD, AND BOOT SYSTEM

RELATED APPLICATIONS

This application claims priority to Taiwanese Application Serial Number 109103755, filed Feb. 6, 2020, which is herein incorporated by reference.

BACKGROUND

Technical Field

The present disclosure relates to a circuit technology. More particularly, the present disclosure relates to a boot circuit, a boot method, and a boot system.

Description of Related Art

In general, a circuitry can perform a flash boot by utilizing direct memory access (DMA). The flash boot is to boot the circuitry by utilizing boot information in a flash memory. However, due to many drawbacks about the current flash boot, boot efficiency of the circuitry is poor.

SUMMARY

Some aspects of the present disclosure are to provide a boot circuit. The boot circuit is configured to be coupled to a first memory. Boot information is stored in the first memory. The boot circuit is configured to receive the boot information. The boot circuit includes a first control circuit, a digital signal processing circuit, a detector circuit, a second control circuit, and a memory access circuit. The detector circuit is configured to generate a detection result according to the received boot information. The second control circuit is configured to control the first control circuit according to the detection result, to adjust a transmission parameter for transmitting the boot information. Based on the adjusted transmission parameter, the boot information is retransmitted from the first memory, via the memory access circuit, to the digital signal processing circuit. The digital signal processing circuit performs a boot process according to the retransmitted boot information.

Some aspects of the present disclosure are to provide a boot method. The boot method includes: generating a detection result according to boot information transmitted from a memory by a detector circuit; controlling a first control circuit according to the detection result by a second control circuit, to adjust a transmission parameter for transmitting the boot information; and based on the adjusted transmission parameter, retransmitting the boot information from the memory, via a memory access circuit, to a digital signal processing circuit, such that the digital signal processing circuit performs a boot process according to the retransmitted boot information.

Some aspects of the present disclosure are to provide a boot system. The boot system includes: a memory and a boot circuit. Boot information is stored in the memory. The boot circuit is configured to receive the boot information, generate a detection result according to the boot information, and adjust a transmission parameter for transmitting the boot information according to the detection result. The boot information is retransmitted from the memory, via a memory access circuit, to a digital signal processing circuit based on the adjusted transmission parameter. The digital signal processing circuit is configured to perform a boot process according to the retransmitted boot information.

As described above, the boot circuit, the boot method, and the boot system of the present disclosure have a better boot efficiency.

DETAILED DESCRIPTION

Figure 1:
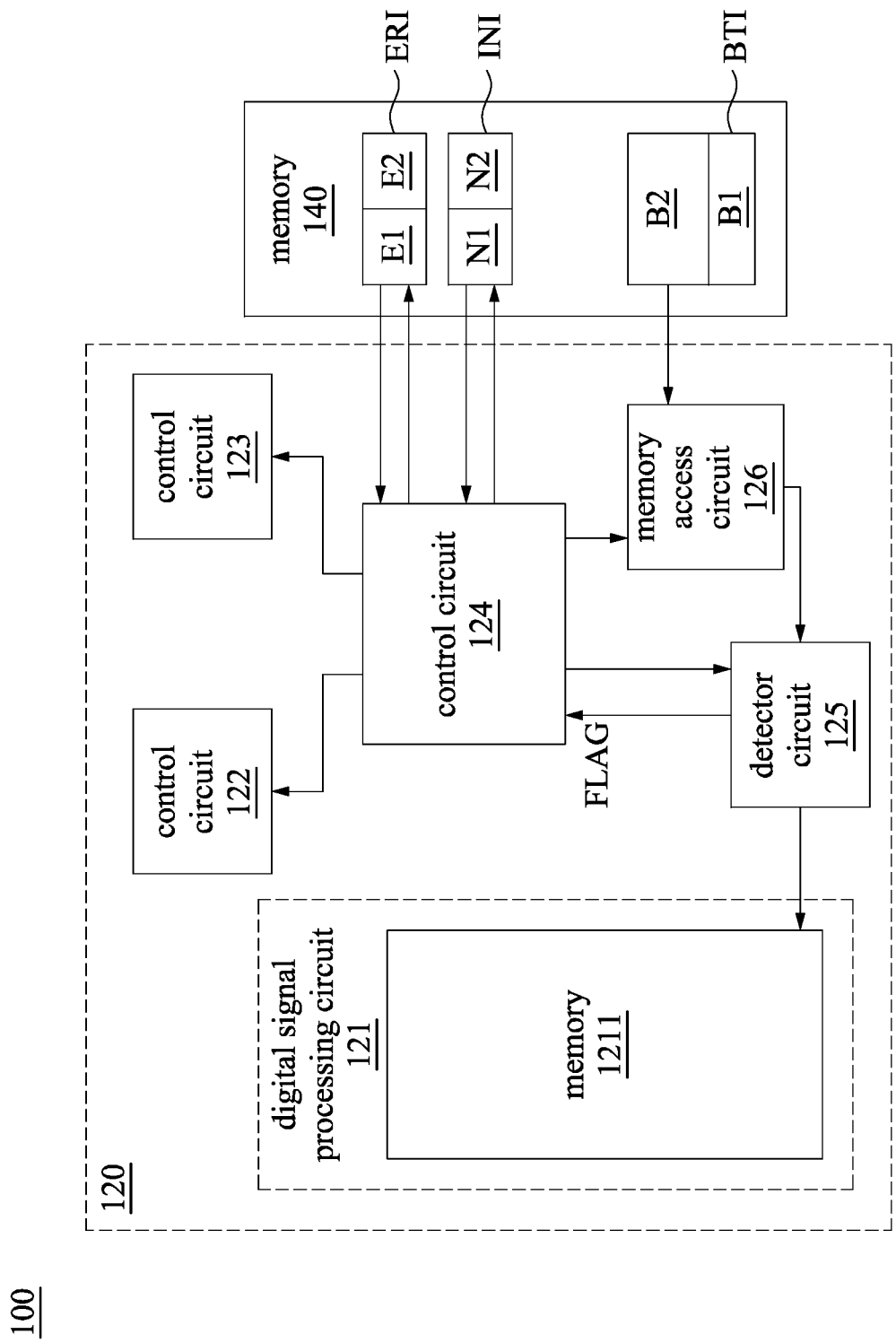
FIG. 1 is a schematic diagram of a boot system according to some embodiments of the present disclosure.

Reference is now made in detail to the present embodiments of the disclosure, examples of which are illustrated in the accompanying drawings. Wherever possible, the same reference numbers are used in the drawings and the description to refer to the same or like parts. The embodiments below are described in detail with the accompanying drawings, but the examples provided are not intended to limit the scope of the disclosure covered by the description. The structure and operation are not intended to limit the execution order. Any structure regrouped by elements, which has an equal effect, is covered by the scope of the present disclosure.

In the present disclosure, "connected" or "coupled" may refer to "electrically connected" or "electrically coupled." "Connected" or "coupled" may also refer to operations or actions between two or more elements.

Reference is made to FIG. 1. FIG. 1 is a schematic diagram of a boot system 100 according to some embodiments of the present disclosure.

As illustrated in FIG. 1, the boot system 100 includes a boot circuit 120 and a memory 140. The boot circuit 120 is coupled to the memory 140. Boot information BTI is stored in the memory 140. The boot circuit 120 is configured to receive the boot information BTI to perform a boot process. In some embodiments, the boot circuit 120 is a system on chip (SoC), and the memory 140 is a flash memory, but the present disclosure is not limited thereto.

The boot circuit 120 includes a digital signal processing (DSP) circuit 121, a control circuit 122, a control circuit 123, a control circuit 124, a detector circuit 125, and a memory access circuit 126. The digital signal processing circuit 121 includes a memory 1211. In some embodiments, the memory 1211 is a random access memory (RAM), the control circuits 122-124 are micro-controllers, and the memory access circuit 126 is a direct memory access (DMA) control circuit, but the present disclosure is not limited thereto. The control circuit 122, the control circuit 123, the detector circuit 125, the memory access circuit 126, and the memory 140 are coupled to the control circuit 124 respectively. The detector circuit 125 is further coupled between the memory access circuit 126 and the memory 1211. In some other embodiments, the control circuits 122-124 are integrated to be a single control circuit (for example, a micro-controller) to perform their original functions, but the present disclosure is not limited thereto.

In addition to the boot information BTI, error correction information ERI and initialization information INI are stored in the memory 140. The error correction information ERI includes an error correction descriptor E1 and a check code E2. The initialization information INI includes an initialization descriptor N1 and a check code N2. The boot information BTI includes a boot program B1 and a check code B2.

The configurations of the boot system 100 above are for illustration, and various configurations of the boot system 100 are within the contemplated scopes of the present disclosure.

Figure 2:
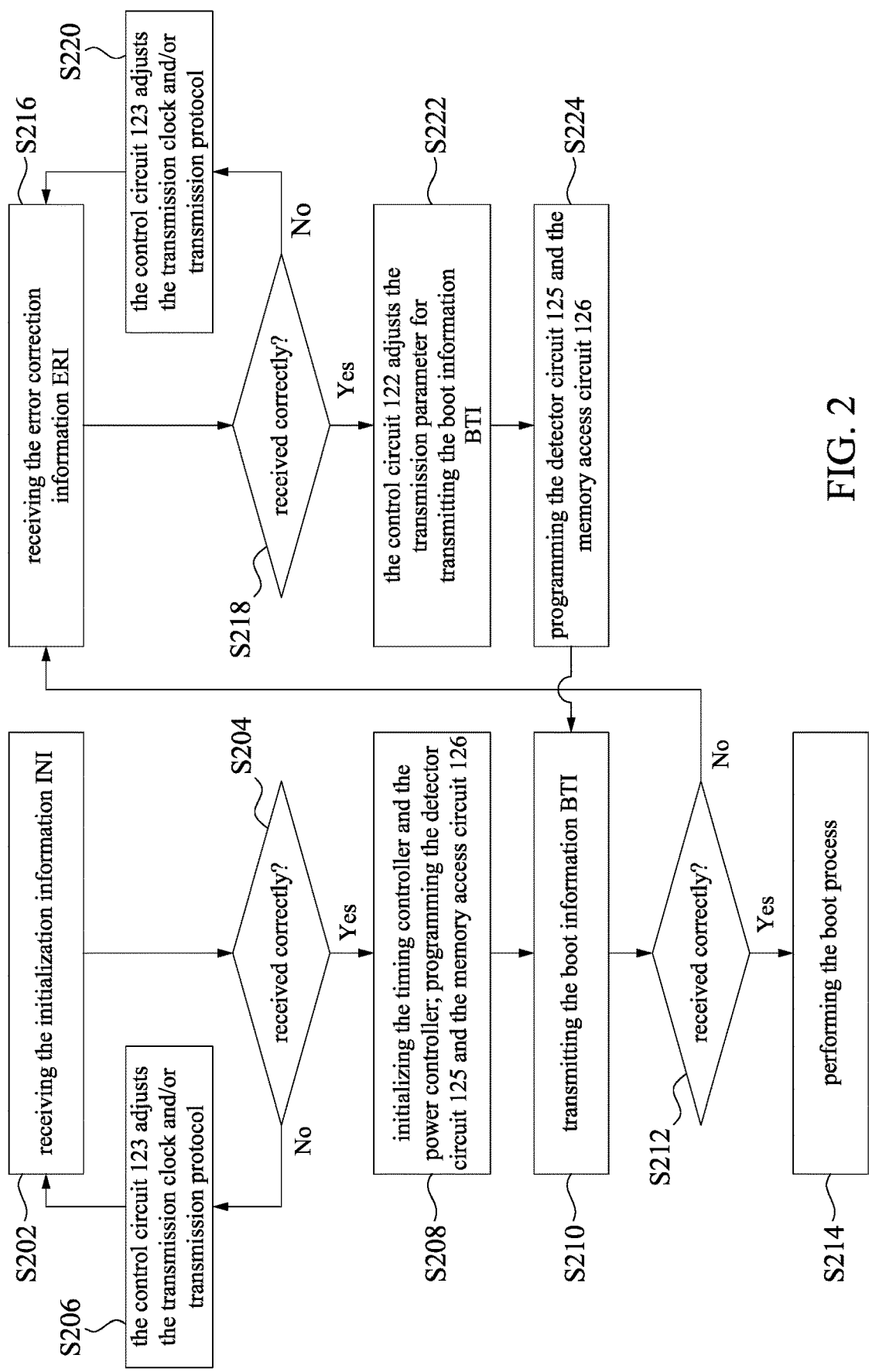
FIG. 2 is a flow diagram illustrating operations of the boot system in FIG. 1 according to some embodiments of the present disclosure.

FIG. 2 is a flow diagram illustrating operations of the boot system 100 in FIG. 1 according to some embodiments of the present disclosure. Following paragraphs are provided with reference to FIG. 1 and FIG. 2.

In operation S202, the control circuit 124 receives the initialization information INI from the memory 140. In specific, the control circuit 124 sends a request. In response to the request, the memory 140 sends back the initialization information INI to the control circuit 124. Then, in operation S204, the control circuit 124 determines whether the initialization information INI is received correctly according to the check code N2 of the initialization information INI.

If the initialization information INI is not received by the control circuit 124 correctly, operation S206 is performed. In operation S206, the control circuit 124 controls the control circuit 123 to adjust a transmission clock and/or a transmission protocol for transmitting the initialization information INI. The initialization information INI is retransmitted to the control circuit 124 based on the adjusted transmission clock and/or the adjusted transmission protocol. In some embodiments, a clock rate of the transmission clock is reduced (for example, reduced to a slowest rate). The transmission protocol is adjusted to be a single-bit transmission protocol. Accordingly, reliability of the transmission process of the initialization information INI is increased.

If the initialization information INI is received by the control circuit 124 correctly, operation S208 is performed. In operation S208, the control circuit 124 performs an initialization process according to the initialization information INI, to initialize (for example, power-on) a timing controller (not shown) and a power controller (not shown) of the boot circuit 120, and programs the detector circuit 125 and the memory access circuit 126. Accordingly, the boot circuit 120 can operate according to the initialized timing controller and the initialized power controller, and the memory access circuit 126 can receive the boot information BTI according an access address.

In operation S210, the boot information BTI is transmitted. In specific, the memory access circuit 126 transmits the boot information BTI stored in the memory 140 to the detector circuit 125. Then, in operation S212, the detector circuit 125 determines whether the boot information BTI is received correctly according to the check code B2 of the received the boot information BTI, to generate a detection result FLAG.

If the detection result FLAG indicates that the boot information BTI is received by the detector circuit 125 correctly, operation S214 is performed. In operation S214, the digital signal processing circuit 121 of the boot circuit 120 performs the boot process according to the boot program B1.

If the detection result FLAG indicates that the boot information BTI is not received by the detector circuit 125 correctly, operation S216 is entered. In operation S216, the control circuit 124 receives the error correction information ERI from the memory 140. Then, in operation S218, the control circuit 124 determines whether the error correction information ERI is received correctly according to the check code E2 of the error correction information ERI. Similar to operation S206, in operation S220, if the error correction information ERI is not received by the control circuit 124 correctly, the control circuit 124 controls the control circuit 123 to adjust a transmission clock and/or a transmission protocol for transmitting the error correction information ERI. The error correction information ERI is retransmitted to the control circuit 124 based on the adjusted transmission clock and/or transmission protocol. In some embodiments, a clock rate of the transmission clock is reduced (for example, reduced to a slowest rate). The transmission protocol is adjusted to be a single-bit transmission protocol. Accordingly, reliability of the transmission process of the error correction information ERI is increased.

In operation S222, if the error correction information ERI is received by the control circuit 124 correctly, the control circuit 124 controls the control circuit 122 according to the error correction information ERI to adjust a transmission parameter for transmitting the boot information BTI. The transmission parameter includes a clock rate, a power voltage, a pad driving capability, or a transmission protocol for transmitting the boot information BTI. For example, the control circuit 122 can reduce the clock rate for transmitting the boot information BTI. The control circuit 122 can increase the power voltage. The control circuit 122 can increase the pad driving capability. The control circuit 122 can adjust the transmission protocol for transmitting the boot information BTI to be a transmission protocol having a better reliability. Based on the adjustments, reliability of the transmission process of the boot information BTI is increased.

Then, in operation S224, the detector circuit 125 and the memory access circuit 126 are programmed again. In operation S210, based on the adjusted parameter in operation S222, the boot information BTI is retransmitted from the memory 140, via the memory access circuit 126, to the digital signal processing circuit 121.

Then, in operation S212, the detector circuit 125 determines whether the retransmitted boot information BTI is received correctly according to the check code B2 of the received boot information BTI, to generate the detection result FLAG.

In operation S214, if the detection result FLAG indicates that the retransmitted boot information BTI is received by the detector circuit 125 correctly, the digital signal processing circuit 121 of the boot circuit 120 performs the boot process according to the retransmitted boot program B1.

In some related approaches, if the boot information BTI is not received correctly, the system utilizes the same transmission parameter to perform the retransmission process. Compared to these related approaches, the boot system 100 of the present disclosure has an automatic adjustment mechanism, and thus the boot system 100 of the present disclosure can automatic adjust the transmission parameter for retransmitting the boot information BTI, to improve reliability of the retransmission process. Accordingly, it is easier that the retransmitted boot information BTI is received correctly, such that the boot system 100 has a better boot efficiency.

Figure 3:
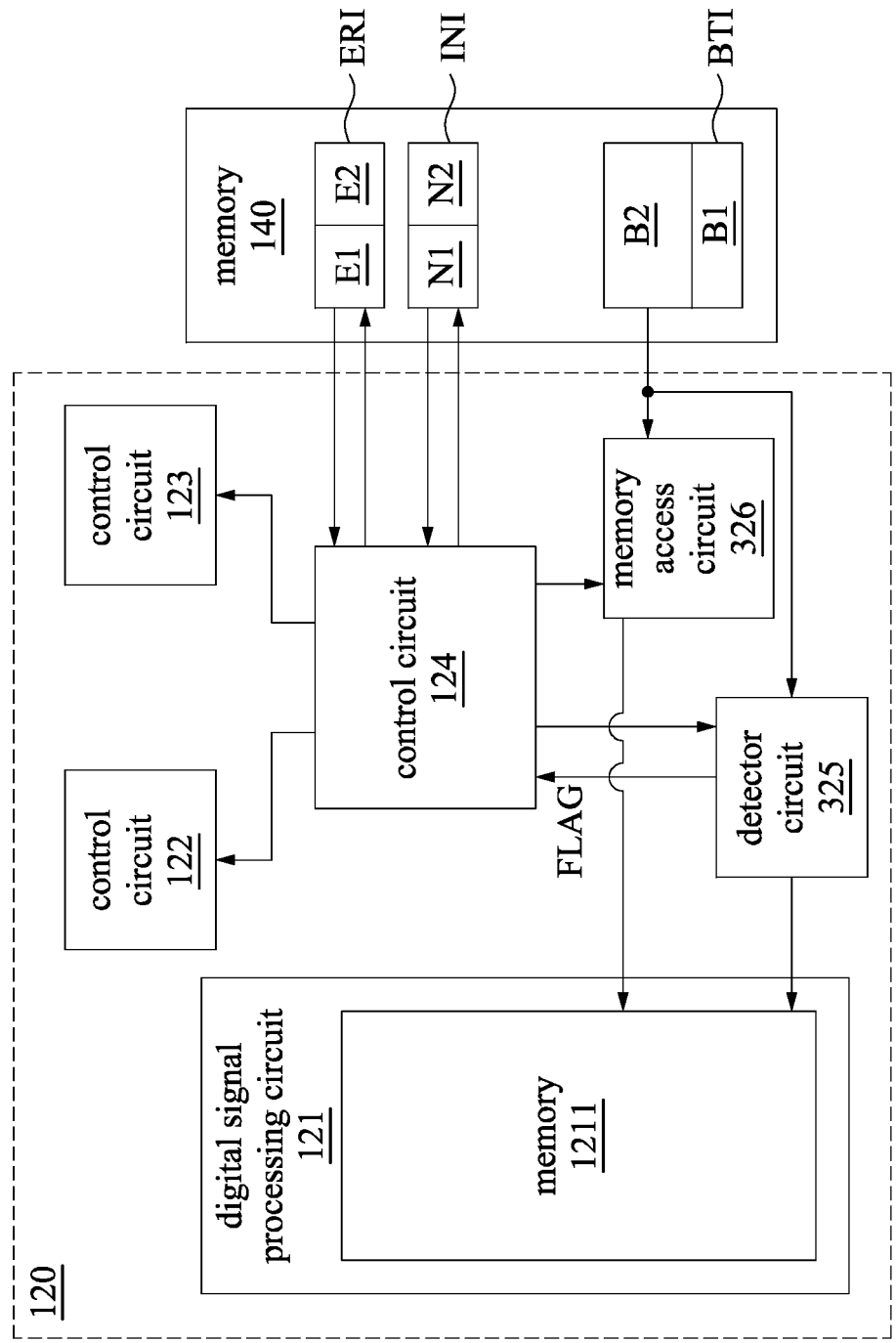
FIG. 3 is a schematic diagram of a boot system according to some embodiments of the present disclosure.

Reference is made to FIG. 3. FIG. 3 is a schematic diagram of a boot system 300 according to some embodiments of the present disclosure. The boot system 300 in FIG. 3 is similar to the boot system 100 of FIG. 1.

A main difference between the boot system 300 in FIG. 3 and the boot system 100 in FIG. 1 is that a detector circuit 325 and a memory access circuit 326 of the boot system 300 are coupled to the memory 1211 of the digital signal processing circuit 121 individually. The detector circuit 325 can receive the boot information BTI from the memory 140 directly without passing through the memory access circuit 326. Operations of the boot system 300 in FIG. 3 are similar to the boot system 100 in FIG. 1, so they are not described herein again.

Figure 4:
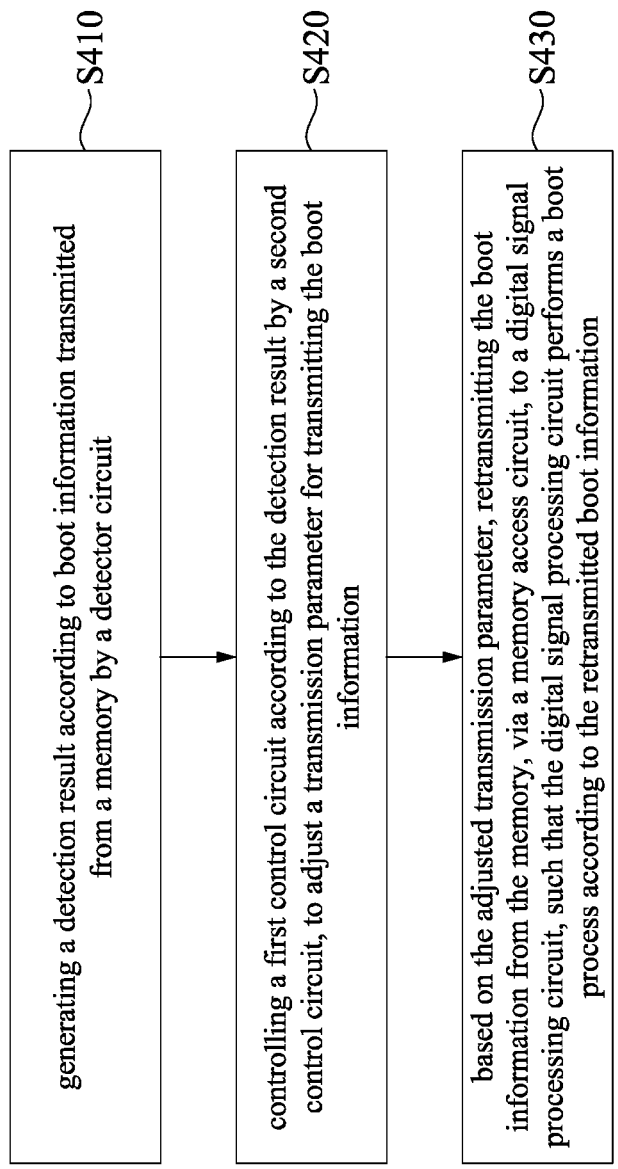
FIG. 4 is a flow diagram illustrating a boot method according to some embodiments of the present disclosure.

Reference is made to FIG. 4. FIG. 4 is a flow diagram illustrating a boot method 400 according to some embodiments of the present disclosure. The boot method 400 includes operations S410, S420, and S430. In some embodiments, the boot method 400 is applied to the boot system 100 in FIG. 1 or the boot system 300 in FIG. 3, but the present disclosure is not limited thereto. For ease of understanding, the boot method 400 is discussed with the boot system 100 in FIG. 1.

In operation S410, the detector circuit 125 generates the detection result FLAG according to the boot information BTI transmitted from the memory 140. In some embodiments, the detector circuit 125 determines whether the boot information BTI is received correctly according to the check code B2 of the received boot information BTI, to generate the detection result FLAG.

In operation S420, the control circuit 124 controls the control circuit 122 according to the detection result FLAG, to adjust the transmission parameter for transmitting the boot information BTI. In some embodiments, if the boot information BTI is not received correctly, the transmission parameter for transmitting the boot information BTI is adjusted. The transmission parameter includes the clock rate, the power voltage, the pad driving capability, or the transmission protocol for transmitting the boot information BTI.

In operation S430, based on the adjusted transmission parameter, the boot information BTI is retransmitted from the memory 140, via the memory access circuit 126, to the digital signal processing circuit 121, such that the digital signal processing circuit 121 performs the boot process according to the retransmitted boot information BTI.

As described above, the boot circuit, the boot method, and the boot system of the present disclosure have a better boot efficiency.

Various functional components or blocks have been described herein. As will be appreciated by persons skilled in the art, in some embodiments, the functional blocks will preferably be implemented through circuits (either dedicated circuits, or general purpose circuits, which operate under the control of one or more processors and coded instructions), which will typically comprise transistors or other circuit elements that are configured in such a way as to control the operation of the circuitry in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A boot circuit configured to couple a first memory, wherein boot information is stored in the first memory, wherein the boot circuit is configured to receive the boot information, wherein the boot circuit comprises:
a first control circuit;
a digital signal processing circuit;
a detector circuit configured to generate a detection result according to the received boot information;
a second control circuit configured to control the first control circuit according to the detection result, to adjust a transmission parameter for transmitting the boot information, wherein the second control circuit is configured to receive initialization information;
a memory access circuit, wherein based on the adjusted transmission parameter, the boot information is retransmitted from the first memory, via the memory access circuit, to the digital signal processing circuit, wherein the digital signal processing circuit performs a boot process according to the retransmitted boot information, wherein the memory access circuit is a direct memory access (DMA) control circuit; and
a third control circuit, wherein when the initialization information is not received by the second control circuit correctly, the second control circuit controls the third control circuit to adjust a transmission clock or a transmission protocol, and the initialization information is retransmitted to the second control circuit based on the adjusted transmission clock or the adjusted transmission protocol.

2. The boot circuit of claim 1, wherein the second control circuit is configured to receive error correction information from the first memory according to the detection result.

3. The boot circuit of claim 2, wherein when the error correction information is received by the second control circuit correctly, the second control circuit is configured to control the first control circuit according to the error correction information, to adjust the transmission parameter.

4. The boot circuit of claim 3,
wherein when the error correction information is not received by the second control circuit correctly, the second control circuit controls the third control circuit to adjust the transmission clock or the transmission protocol, and the error correction information is retransmitted to the second control circuit based on the adjusted transmission clock or the adjusted transmission protocol.

5. The boot circuit of claim 4, wherein the third control circuit reduces a clock rate of the transmission clock, or controls the transmission protocol to be a single-bit transmission protocol.

6. The boot circuit of claim 1, wherein when the initialization information is received by the second control circuit correctly, the second control circuit initializes a timing controller and a power controller according to the initialization information and programs the memory access circuit and the detector circuit.

7. The boot circuit of claim 6, wherein the second control circuit is configured to control the memory access circuit according to the initialization information, such that the memory access circuit receives the boot information according to an access address.

8. The boot circuit of claim 1, wherein the digital signal processing circuit comprises a second memory, and the detector circuit is coupled between the memory access circuit and the second memory.

9. The boot circuit of claim 1, wherein memory access circuit and the detector circuit are coupled to the first memory individually.

10. The boot circuit of claim 1, wherein the transmission parameter comprises a clock rate, a power voltage, or a pad driving capability.

11. A boot method, comprising:
generating a detection result according to boot information transmitted from a memory by a detector circuit;
controlling a first control circuit according to the detection result by a second control circuit, to adjust a transmission parameter for transmitting the boot information;
based on the adjusted transmission parameter, retransmitting the boot information from the memory, via a memory access circuit, to a digital signal processing circuit, such that the digital signal processing circuit performs a boot process according to the retransmitted boot information, wherein the memory access circuit is a direct memory access (DMA) control circuit;
receiving initialization information from the memory by the second control circuit; and
when the initialization information is not received by the second control circuit correctly, controlling a third control circuit by the second control circuit to adjust a transmission clock or a transmission protocol, and retransmitting the initialization information to the second control circuit based on the adjusted transmission clock or the adjusted transmission protocol.

12. The boot method of claim 11 further comprising:
receiving error correction information from the memory according to the detection result by the second control circuit.

13. The boot method of claim 12, further comprising:
when the error correction information is received by the second control circuit correctly, controlling the first control circuit according to the error correction information by the second control circuit, to adjust the transmission parameter.

14. The boot method of claim 13, further comprising:
when the error correction information is not received by the second control circuit correctly, controlling the third control circuit by the second control circuit to adjust the transmission clock or the transmission protocol; and
based on the adjusted transmission clock or the adjusted transmission protocol, retransmitting the error correction information to the second control circuit.

15. The boot method of claim 14, wherein adjusting the transmission clock or the transmission protocol comprises:
reducing a clock rate of the transmission clock by the third control circuit, or controlling the transmission protocol to be a single-bit transmission protocol by the third control circuit.

16. The boot method of claim 11, further comprising:
when the initialization information is received by the second control circuit correctly, initializing a timing controller and a power controller according to the initialization information and programing the memory access circuit and the detector circuit by the second control circuit.

17. The boot method of claim 11, wherein adjusting the transmission parameter comprises:
adjusting a clock rate, a power voltage, or a pad driving capability.

18. A boot system, comprising:
a memory, wherein boot information is stored in the memory; and
a boot circuit configured to receive the boot information, generate a detection result according to the received boot information, and wherein a second control circuit of the boot circuit is configured to control a first control circuit of the boot circuit to adjust a transmission parameter for transmitting the boot information according to the detection result, wherein the second control circuit is configured to receive initialization information, wherein the boot information is retransmitted from the memory, via a memory access circuit, to a digital signal processing circuit based on the adjusted transmission parameter, wherein the digital signal processing circuit is configured to perform a boot process according to the retransmitted boot information, wherein the memory access circuit is a direct memory access (DMA) control circuit;
wherein when the initialization information is not received by the second control circuit correctly, the second control circuit controls a third control circuit of the boot circuit to adjust a transmission clock or a transmission protocol, and the initialization information is retransmitted to the second control circuit based on the adjusted transmission clock or the adjusted transmission protocol.

* * * * *